United States Patent [19]

Girgenti

[11] Patent Number: 4,619,145
[45] Date of Patent: Oct. 28, 1986

[54] APPARATUS FOR MONITORING SOLIDS FEED, DRY SOLIDS FLOW

[75] Inventor: Russell S. Girgenti, So. Hamilton, Mass.

[73] Assignee: Auburn International, Inc., Danvers, Mass.

[21] Appl. No.: 658,585

[22] Filed: Oct. 9, 1984

[51] Int. Cl.[4] .............................................. G01F 1/74
[52] U.S. Cl. ................................ 73/861.04; 73/861.08
[58] Field of Search ........... 73/861.04, 861.08, 861.09; 324/454

[56] References Cited

U.S. PATENT DOCUMENTS 2,491,445  12/1949  Cunningham et al. .......... 73/861.09

Primary Examiner—Donald O. Woodiel
Attorney, Agent, or Firm—Jerry Cohen

[57] ABSTRACT

A non-intrusive apparatus for detecting dry solids flow having a critical, flow cross section of less than 0.2 square inches defining a critical flow path including a friction sensitive electrode with a bore and an insulator for insulating the electrode from electrical interference, an exterior flow path communicating with the critical flow path and, electrode lead and a readout communicating with the friction sensitive electrode for monitoring charge transfer created by friction within the friction sensitive electrode, the electrode lead constructed for insulating the electrode from electrical interference.

3 Claims, 1 Drawing Figure

APPARATUS FOR MONITORING SOLIDS FEED, DRY SOLIDS FLOW

BACKGROUND OF THE INVENTION

There often arises a need to detect the existence, rate and quantity of dry solids in small diameter process piping (e.g. the flow of catalysts fed into reactor vessels), without obstructing or intruding into the flow path.

The present invention provides a non-intrusive means for monitoring the flow of such dry solids by directing flow through a friction sensitive electrode, equal in diameter to the process piping, and which detects the presence of solids by virtue of electrical charge transfer, which is created within the inner diameter of the electrode as a result of frictional contact of the solids with the electrode.

While such a friction sensitive electrode is capable of detecting the particulate matter, the sensitivity of such an electrode can be rendered meaningless by the interference of outside sources of electrical generating current, such as internal movement or the intrusion of external electric fields.

At present, there is no reliable non-intrusive means of detecting the flow of dry solids in small diameter (under 0.500" diameter) process piping.

SUMMARY OF THE INVENTION

In accordance with the present invention, there is provided a non-intrusive apparatus for detecting dry solids in a stream, having a flow cross section of less than about 0.2 square inches.

The apparatus comprises means defining a critical flow path including a friction sensitive electrode with a bore and a first means for insulating the electrode from the rest of the piping and electrical interference; means defining an exterior flow path communicating with said critical flow path; electrode lead and readout means communicating with the friction sensitive electrode; means for monitoring charge transfer created by friction within the friction sensitive electrode, (said electrode lead including a second means for insulating the electrode lead from movement due to ambient vibration and a means for shielding the electrode and lead from exterior electrical interference.

The electrode lead means of the invention may further include an electrically conductive spring communicating with the friction sensitive electrode. The exterior flow path of the invention may comprise a first and second tube, each tube including a bore approximately equal to the bore of the friction sensitive electrode wherein each of the tubes includes one of the first means for insulating. The exterior flow path preferably further includes means for readily sealably connecting the bore of the tubes with the bore of the friction sensitive electrode.

The apparatus of the invention preferably includes a housing spaced apart from the electrode lead wherein the second means for insulating is positioned within the space between the housing and the electrode lead in intimate contact with a portion of the electrode lead not including the spring, thereby maintaining an electrically non-conducting space between the housing and the electrode lead. The apparatus further includes a housing surrounding and spaced apart from the critical flow path wherein the first means for insulating preferably supports the friction sensitive electrode and the tubes in a spaced relationship from the housing. The critical flow path preferably includes a recess surrounding the bore of the friction sensitive electrode for receiving the first means for insulating. The spring is preferably sufficiently engaged to the friction sensitive electrode to maintain electrical contact.

It is, therefore, an object of the invention to provide a non-intrusive means for detecting and monitoring the flow of dry solids.

It is an object of the present invention to minimize and eliminate any sources of electrical interference with the detection and monitoring of the dry solids flow in a pipe.

It is a further object of the present invention to provide a simple and inexpensive means of monitoring dry solids flow in a pipe.

Other objects, features and advantages will be apparent from the following detailed description of preferred embodiments thereof taken in connection with the accompanying drawing.

BRIEF DESCRIPTION OF THE DRAWING

The single FIGURE of drawing is a cross-sectional view of the apparatus for detecting dry solids flow.

DETAILED DESCRIPTION OF THE INVENTION

Figure 1:
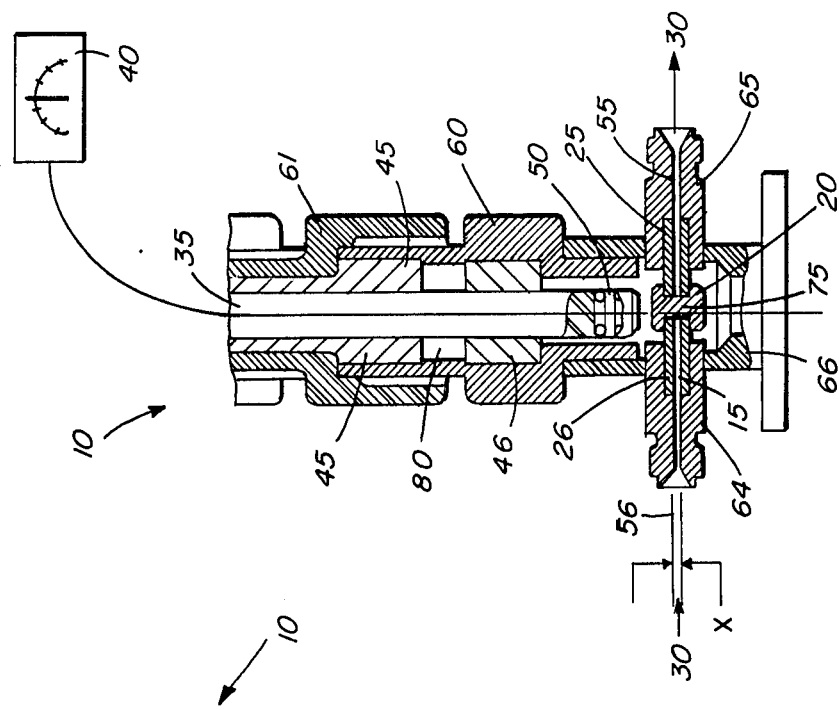

Preferred embodiments of the invention are described hereafter with reference to the drawing.

With reference to FIG. 1, there is shown a flow monitor 10 according to the present invention. The flow monitor 10 comprises a critical flow path 15, which includes the bore 75 of a friction sensitive electrode 20 and the bore of insulators 25, 26. The flow monitor also comprises an exterior flow path, 30, which communicates with the critical flow path 15, and electrode lead 35 and readout means 40, which communicate with frictional sensitive electrode 20. The electrode lead 35 includes insulators 45, 46.

Preferably, the electrode lead 35 includes an electrically conductive spring 50, and a friction sensitive electrode 20. The exterior flow path comprises the bore of tubes 55, 56, each having a bore X which is equal to the bore X, of the friction sensitive electrode 20. The flow monitor 10 may also include a housing 60, which is spaced apart from the electrode lead 35, wherein the insulators 45, 46 are in intimate contact with the electrode lead 35, and maintaining the electrode lead 35 in a stable position within housings 60, 61. The spacing apart of the electrode lead 35 from housings 60, 61 by insulators 45, 46, thereby maintains the electrode lead 35 in an electrically non-conductive space within housings 60, 61.

Figure 2:
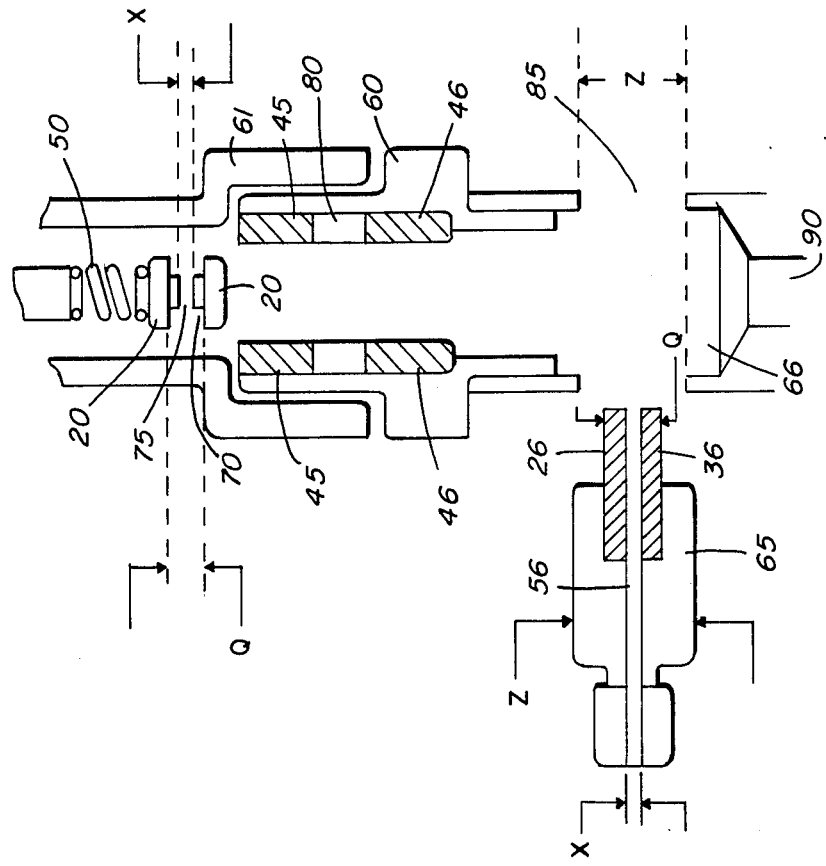

The flow monitor 10, also comprises a housing 64, 65 surrounding and spaced apart from the critical flow path 15 by insulators 25, 26, which may support the friction sensitive electrode 20 in a spaced relationship from housing 64, 65. The critical flow path may include a recess 70 which surrounds the bore 75, FIG. 2, of the friction sensitive electrode 20. The recess 70 is intended to receive insulators 25, 26 which are inserted into recess 70. The spring 50 is also sufficiently engaged to the friction sensitive electrode 20 to maintain electrical contact.

Another component might comprise housing 60, insulators 45, 46, and housing 61. Housings 60 and 61 may be initially separate housings which are readily attachable to each other by screw or other conventional attaching means.

With reference to FIG. 1, a stream of dry solids is introduced into the bore of either tube 56 or tube 55 and flowed through the critical flow path 15, which includes the bore between 75 of the friction sensitive electrode 20 and the bore between insulators 25, 26. The diameter X of the bore 15 is selected to be approximately equal to diameter X of the bore 75 of friction sensitive electrode 20. The constant diameter X of the exterior flow path 30 and the critical flow path cooperate with each other such that the flow of dry solids therethrough is not interrupted to any substantial degree and thus the continuum of solid particle flow, will not be interrupted such as by a shelf.

As the flow of dry solids passes through the bore 75, FIG. 1, of friction sensitive electrode 20, particulate matter contained in that stream 30 will ultimately collide with the walls of the bore 75 creating friction and inducing a charge transfer (triboelectric effect), which is ultimately measurable via communication of electrode 20 with spring 50, electrode lead 35 and electrode read out 40. Friction sensitive electrode 20 may be comprised of AISI 300 series stainless steel and is extremely sensitive to generation of readable current by the friction of the flowing dry solids.

Spring 50, is provided to enable alignment of the recess 70 of electrode 20, with insulators 25, 26 to absorb any forces applied against insulators 25, 26, during assembly. Electrode lead 35 fits with minimum clearance through insulators 45, 46, and snugly through seal 80 located in the space between insulators 45 and 46.

Seal 80, compressed between insulators 45, 46, expands against housing 60 and electrode lead 35, the resultant force of which is exerted on insulators 25, 26. Such insulators, typically brittle, will chip or crack. Spring 50 is, therefore, provided to absorb any force applied against insulators 25, 26, and in aligning friction sensitive electrode 20 therewith. Recess 70, is provided with a width Q, which is approximately equal to the outside diameter Q of insulators 25, and 26, which slidably fit into recess 70.

The simultaneous fitting of insulators 25, 26 into recess 70 acts to support friction sensitive electrode 20 in a stable position spaced apart from housing 65 and 60. The spacing apart of friction sensitive electrode 20 from housings 65, 60, together with the use of non-electrically conductive material to comprise insulators 25, 26 serve to prevent extraneous electrical current from being generated in electrode 20. Insulators 25, 26, 45 and 46 may typically be comprised of alumina and other conventional ceramic or insulating materials.

Electrode lead 35 and spring 50 are typically comprised of 300 series stainless steel and other conventional materials.

The cross-sectional area of critical flow path 15 is preferably uniform throughout its length and typically should not exceed about 0.2 square inches in area.

Housings 64, 65 which contain either of bores 55 or 55, and either of insulators 25, 26, connected by heli-arc welding to housings 60, 66. The critical flow path 15, is ultimately constructed by slidably inserting the combined mechanisms 35, 50 and 20 into housings 60, 61 and through the space between insulators 45, 46 FIG. 1. Friction sensitive electrode 20 and its associated bore 75 are aligned with apertures 85, insulators 25, 26, which in turn are inserted into recess 70, and the bores of fittings 64, 65 are aligned with bore 75.

With reference to FIG. 1 after the flow monitor 10 is completely assembled and welded, a relatively fluid potting compound is injected into aperture 90 and allowed to fill as much of the unoccupied space between housings 60, 64, 65, 66 and electrode 35, spring 50, friction sensitive electrode 20 as is available. A seal 80 is also typically provided in the space between insulators 45 and 46. The potting compound which is injected into the cavity of the monitor 10 is intended to harden after a period of time and typically comprises silicone type or other conventional potting material.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A non-intrusive apparatus for detecting dry solids flow, having a critical flow cross section of less than 0.2 square inches, comprising:
    means defining a critical flow path including a friction sensitive electrode with a bore and a first means for insulating the electrode from electrical interference;
    means defining an exterior flow path communicating with said critical flow path; and,
    electrode lead and readout means communicating with the friction sensitive electrode means for monitoring charge transfer created by friction within the friction sensitive electrode, said electrode lead including a second means for insulating the electrode from electrical interference;
    and wherein said electrode lead means further includes an electrically conductive spring communicating with said friction sensitive electrode, said spring adapted to absorb any force applied to the first insulating means during alignment.

2. The apparatus of claim 1 further comprising a housing spaced apart from the electrode lead, wherein the second means for insulating is positioned within the space between the housing and the electrode lead thereby maintaining an electrically non-conductive space between the housing and the electrode lead.

3. The apparatus of claim 1, wherein said spring is sufficiently engaged to said friction sensitive electrode to maintain electrical contact.

* * * * *